United States Patent
Mierzwinski

[11] Patent Number: 6,133,729
[45] Date of Patent: Oct. 17, 2000

[54] SIDE LOOKING HALL-EFFECT VEHICLE SPEED SENSOR WITH AN ALIGNMENT POSITIONING SYSTEM

[75] Inventor: Eugene P. Mierzwinski, Fort Wayne, Ind.

[73] Assignee: Arthur Allen Mfg. Co., Elkhorn, Wis.

[21] Appl. No.: 09/098,494

[22] Filed: Jun. 17, 1998

[51] Int. Cl.[7] .................................. G01P 3/48; G01P 3/54
[52] U.S. Cl. .................. 324/174; 324/207.2; 324/207.21
[58] Field of Search ..................................... 324/160, 163, 324/166, 165, 164, 173, 178, 174, 207.16, 207.2, 207.15, 207.25; 341/15; 340/670, 672; 364/556

[56] References Cited

U.S. PATENT DOCUMENTS

| | | |
|---|---|---|
| 3,846,697 | 11/1974 | Cila et al. . |
| 4,293,814 | 10/1981 | Boyer ....................................... 324/166 |
| 4,465,976 | 8/1984 | Avery et al. . |
| 4,518,918 | 5/1985 | Avery . |
| 4,841,243 | 6/1989 | Bishop et al. ........................... 324/174 |
| 4,859,941 | 8/1989 | Higgs et al. . |
| 4,907,120 | 3/1990 | Kaczmarek et al. . |
| 4,982,155 | 1/1991 | Ramsden . |
| 4,992,731 | 2/1991 | Lorenzen . |
| 5,084,674 | 1/1992 | Lachmann et al. . |
| 5,451,868 | 9/1995 | Lock ........................................ 324/173 |
| 5,609,990 | 3/1997 | Ha et al. . |
| 5,963,028 | 10/1999 | Engel et al. .......................... 324/207.2 |

*Primary Examiner*—Jay Patidar
*Assistant Examiner*—Subhash Zaveri
*Attorney, Agent, or Firm*—Hill & Simpson

[57] ABSTRACT

A speed sensor for sensing rotating speed of a wheel having projections. An elongated tubular sensor body connects to a flange, the flange being adapted from mounting in a housing wall in proximity to the wheel. A Hall-Effect sensor is provided within the sensor body and circuitry is also located there for processing signals from the Hall-Effect sensor. The Hall-Effect sensor is positioned for sensing the projections of the wheel through a portion of a peripheral sidewall of the cylindrical sensor body so that the Hall-Effect sensor is "side-looking". An alignment mark is employed to position the Hall-Effect sensor in sensing alignment with the wheel. A diameter of the flange cooperates with a placement of a receiving aperture in the housing for setting a width of a gap between the portion of the sensor body through which the Hall-Effect sensor is sensing and the projections of the wheel.

17 Claims, 4 Drawing Sheets

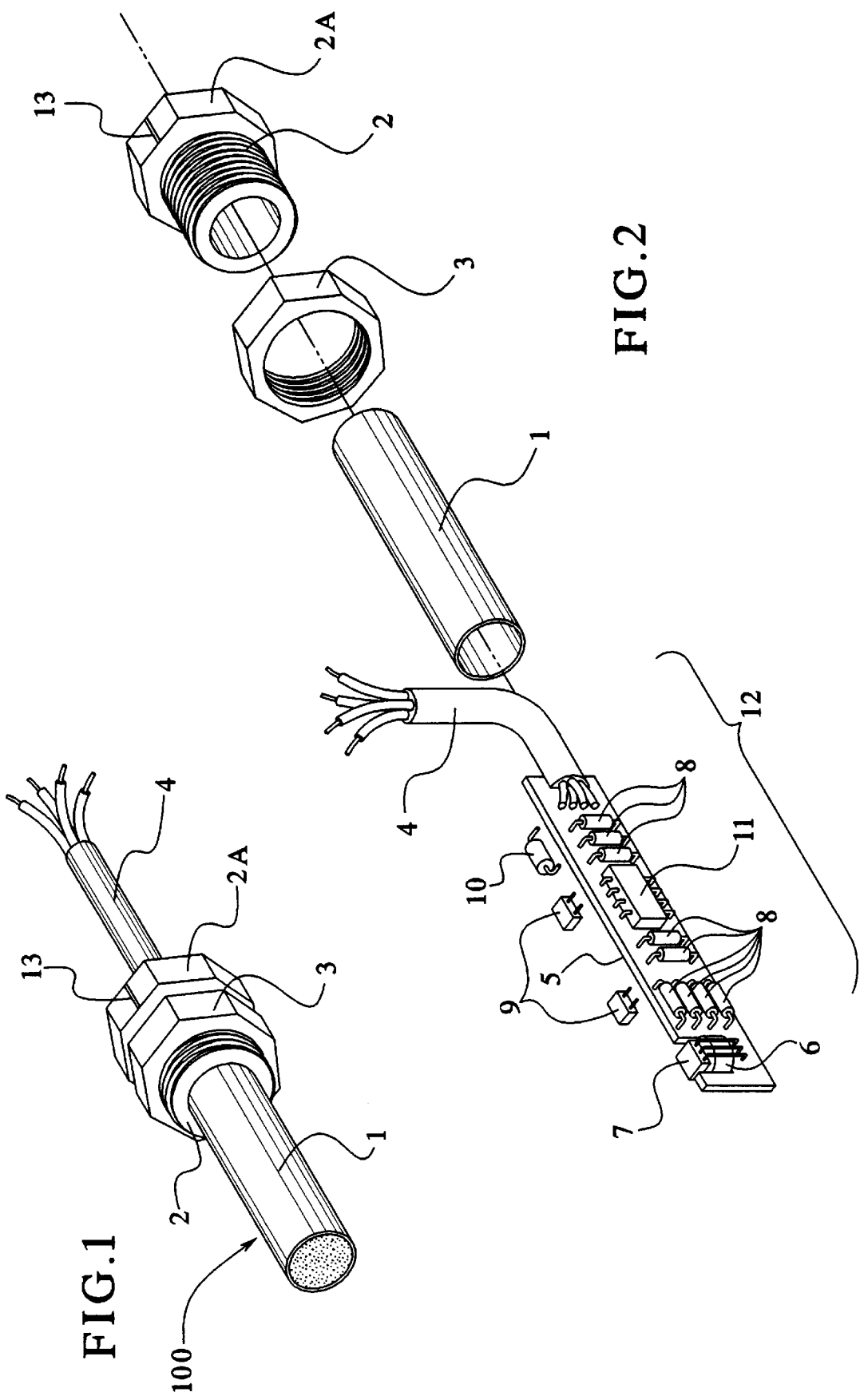

SIDE LOOKING HALL-EFFECT VEHICLE SPEED SENSOR WITH AN ALIGNMENT POSITIONING SYSTEM

BACKGROUND OF THE INVENTION

In order to control engine performance electronically, it is necessary to provide a variety of signals to the engine control module. These signals indicate the status of the parameter being detected and to which the control must respond. Among status signals necessary is a signal that is indicative of the vehicle speed.

Transmission manufacturers provide a means of generating a signal which is proportional to the rate of rotation of the drive shaft. This is accomplished by placing a tone wheel, a wheel which has about its circumference lands and valleys of equal width, in line with the power take off shaft. The signal which is indicative of the vehicle shaft rotation is generated by inserting a vehicle speed sensor into a port opposite the face of the tone wheel until the sensor comes in contact with the face of the tone wheel, then backed off a half turn or to an orientation mark. The gap between the land of the tone wheel and the sensor tip is usually approximately 0.050 (fifty thousands) of an inch. As the tone wheel rotates, the lands and valleys alternately pass over the sensor head. Each time a land passes, the gap is approximately fifty thousands of an inch. Each time a valley passes, the gap increases to as much as a quarter of an inch. These changes in gap size change the magnetic field concentration between the sensor head and the tone wheel. This change in magnetic field concentration causes self-induction process to take place within the sensor winding which in turn causes a voltage to appear at the coil's output leads. This voltage is semi-sinusoidal whose frequency and voltage amplitude is proportional to the rotational speed of the tone wheel.

Vehicle speed sensors which use a Hall-Effect device as the signal generating element also have been used. These have the advantage of generating a signal of uniform amplitude over the entire vehicle speed range. These too were applied as described above. Again the transducer body contains a Hall-Effect sensing element which is magnetically biased by a permanent magnet mounted in communication with and immediately behind the sensor. The face of the sensing element is approximately 0.015 inches from the end of the sensor body face. As the transducer is screwed into the transducer port of the transmission, it is driven in until it bottoms out against the tone wheel, and is then backed off until an orientation mark aligns in line with the tone wheel. This orientation is important because the Hall-Effect sensing element is position sensitive. The resulting gap between the tone wheel and the sensing element is usually less than 0.050 inches.

As the tone wheel rotates, the lands and valleys pass over the sensing element which changes the concentration of the magnetic field generated by the biasing magnet. These changes in field concentration cause changes in electrical current flow through the sensing element. These changes in current flow are processed by appropriate circuitry, which processing results in a pulse train of constant amplitude but whose pulse rate varies in direction proportion to the rotation speed of the tone wheel. The duty cycle of the output pulses is proportional to the length of the lands and valleys on the tone wheel. Usually, the lengths of the lands and valleys are equal which results in an essentially square wave output.

In an effort to reduce the weight of vehicles and thereby improve fuel efficiency, some manufacturers are using components of lighter weight materials or reducing the size of components whose material properties cannot change. One manufacturer uses a tone wheel which is half the diameter of a previously used tone wheel at a weight savings of approximately three pounds. This reduced diameter is used in the same transmission housing with the same sensor port as was used with the larger diameter tone wheel. End looking vehicle speed sensors when inserted into the same sensor port could no longer butt up against the smaller diameter tone wheel and therefore cannot be used.

SUMMARY OF THE INVENTION

It is an object of the invention to provide a speed sensor which does not require butting up against the wheel having lands and valleys and whose speed is to be sensed.

To overcome this difficulty, a new "side looking" transducer was developed using the Hall-Effect sensing element. This "side looking" vehicle speed sensor does not require the end of the sensor housing to come into contact with the tone wheel. Rather, the vehicle speed sensor is designed in such a way that it can be located adjacent to the tone wheel, and still be affected by the lands and valleys of the tone wheel.

To accomplish this, the Hall-Effect sensing element is oriented so that it looks out from the side of the sensor body rather than the end of it. In addition, the physical dimensions of the entire assembly are such as to allow the transducer to be inserted into the transducer port and driven in all the way. It is then backed out until the orientation mark is properly aligned and a lock nut is tightened. The physical design places the sensing element approximately 0.035 inches from the land of the tone wheel.

With the speed sensor of the present invention for sensing rotating speed of a wheel having projections, an elongated tubular sensor body is provided connecting to a flange. The flange is adapted to mount in the housing wall in proximity to the wheel having the projections. A Hall-Effect sensor is provided within the sensor body and circuitry is also located there for processing signals from the Hall-Effect sensor. The Hall-Effect sensor is positioned for sensing the projections of the wheel through a portion of a peripheral sidewall of the cylindrical sensor body. An alignment mark is provided on the flange for positioning the Hall-Effect sensor in sensing alignment with the wheel. A diameter of the flange cooperates with a placement of a receiving aperture in the housing for setting a width of a gap between the portion of the sensor body through which the Hall-Effect sensor is sensing and projections of the wheel.

BRIEF DESCRIPTION OF THE DRAWINGS

FIG. 1 is a perspective view of the side-looking, Hall-Effect, dual output vehicle speed sensor including the lock nut fully assembled;

FIG. 2 is an exploded perspective view of the same sensor in which the principle components and their approximate location relative to one another are shown;

DESCRIPTION OF THE PREFERRED EMBODIMENTS

Figure 3:
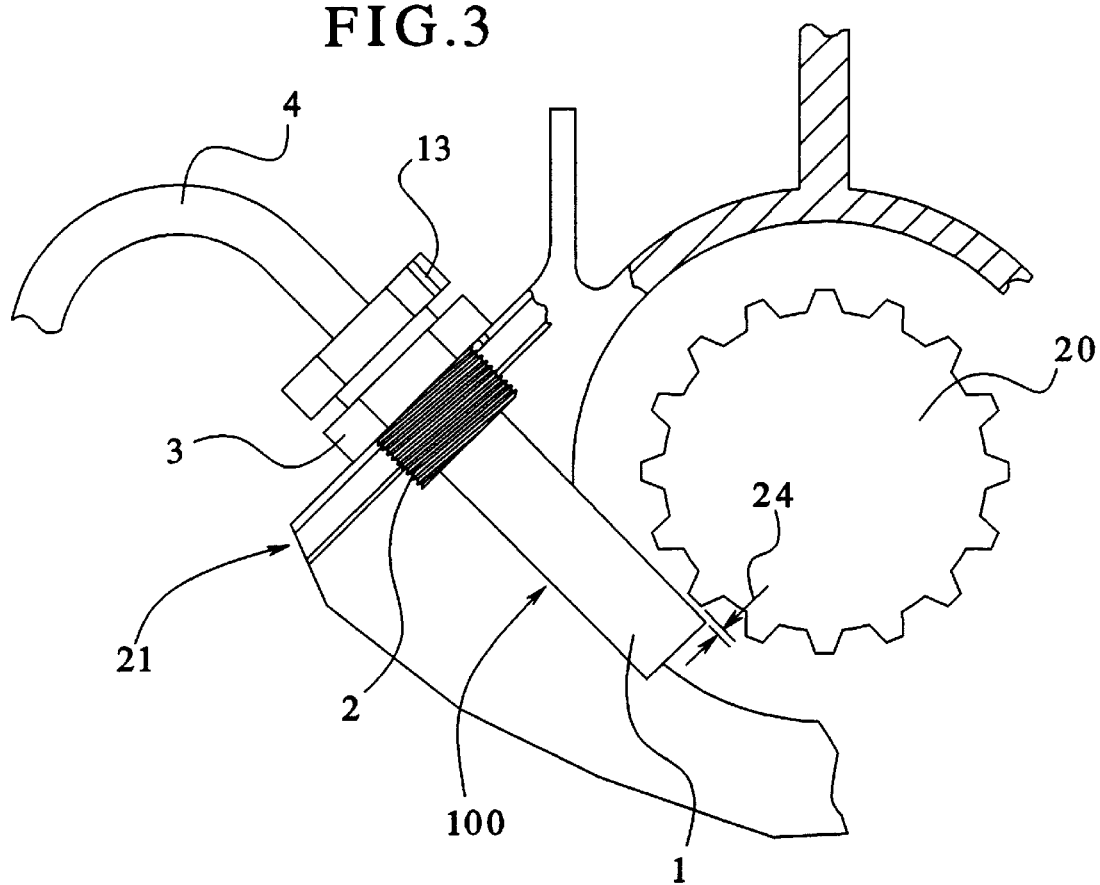
FIG. 3 is a side view of a typical installation of the side-looking vehicle speed sensor.

As shown in FIG. 1, the side-looking vehicle speed sensor element 100 is an assembly formed of a sensor body 1, sensor flange 2 having a hex head 2A with an orientation mark 13 and a lock nut 3. Signals generated within the sensor are communicated to the outside world by means of a four conductor cable 4.

In the exploded view of FIG. 2 are shown the individual pieces which comprise the transducer assembly. In particular, it is desirable to point out that housed within the sensor body 1 is a sub-assembly referred to as 12. Sub-assembly 12 is a double sided printed wiring board 5 which interconnects all of the electronic components. These components are: a biasing magnet 6, Hall-Effect sensor 7, resistors 8, capacitors 9, rectifier diode 10 and an integrated dual comparator circuit 11.

FIG. 3 shows a typical installation of the side-looking, Hall-Effect vehicle speed sensor in a transmission housing 21. The critical parameters in this design are the physical dimensions of the flange 2, sensor body 1 and the printed wiring board 5. The diameter of the flange 2 is critical because it positions the sensing element at the precise distance from the toothed tone wheel 20 in order to provide a proper gap 24 between the sensing element 100 and the tone wheel 20. Also evident in FIG. 3 is the alignment of the Hall sensor by positioning alignment mark 13 perpendicular to the longitudinal axis of the transmission.

Figure 4:
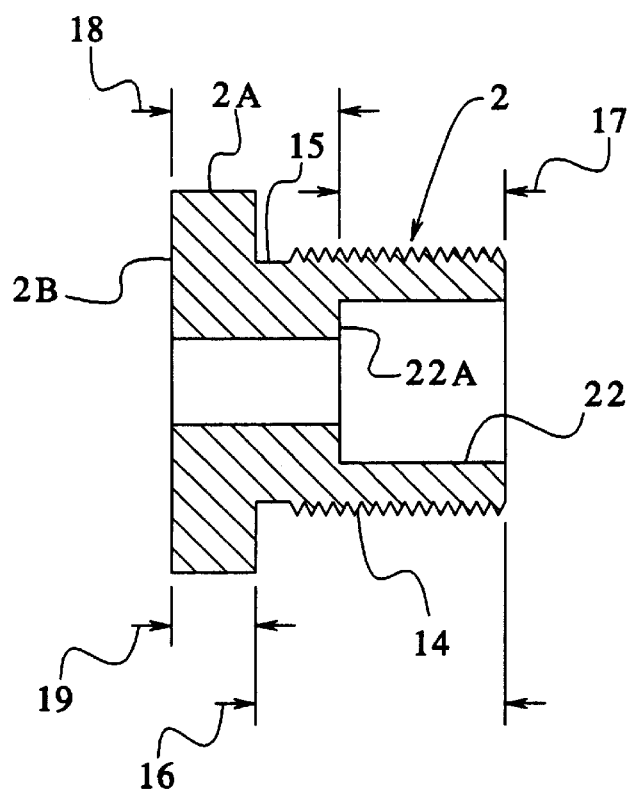
FIG. 4 is a side cross-sectional view of the sensor flange.

FIG. 4 is a schematic representation of the flange 2. It is machined from 1.0 in. Brass hex stock. After machining, a .8125-20 UNEF-2B thread 14 is cut. An undercut 15 is provided to permit the lock nut 3 to bottom out against the hex head 2A. The length of the thread 14 determines the amount of lateral positioning of the sensor element 100 which can be made. In this preferred embodiment, the length is such as to allow the lock nut 3 to be fully threaded up against the hex head 2A of the flange 2. The transducer or sensor element 100 is then driven in until the lock nut 3 bottoms out against the transmission sender port housing 21. Once the transducer or sensor element 100 is fully seated, it is backed off until the orientation mark 13 on the hex head 2A is oriented perpendicular to the longitudinal axis of the transmission. After aligning the orientation mark 13 so that the Hall-Effect sensor 7 is in line with the tone wheel 20, the lock nut 3 is tightened and the transducer or sensor element 100 is locked in place.

How deeply the sensor element 100 is placed into the housing 21 is determined by five critical dimensions. They are: the depth 17 of the bore 22; the distance 18 from the face 2B of the hex head 2A to the of end bore 22; the thickness 19 of the hex head 2A; the thickness of the lock nut 3; and the dimension of the printed wiring board sub-assembly 12.

Figure 5:
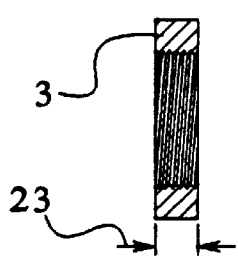
FIG. 5 is a cross-sectional view of the lock nut.

Shown in FIG. 5 is a cross-section of the lock nut 3. The thickness 23 is selected to allow sufficient insertion depth of the transducer into the transmission housing.

Figure 6:
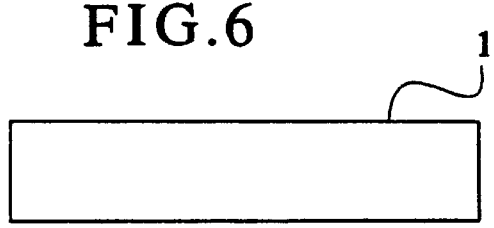
FIG. 6 is a side view of the sensor body.

FIG. 6 depicts the sensor housing or sensor body 1. It is a section of brass tube whose wall thickness is 0.015 inch. This thickness is important because it is part of the gap 24 between the tone wheel 20 and the Hall-Effect sensor 6. This gap 24 must be no greater than 0.050 inches.

Figure 7:
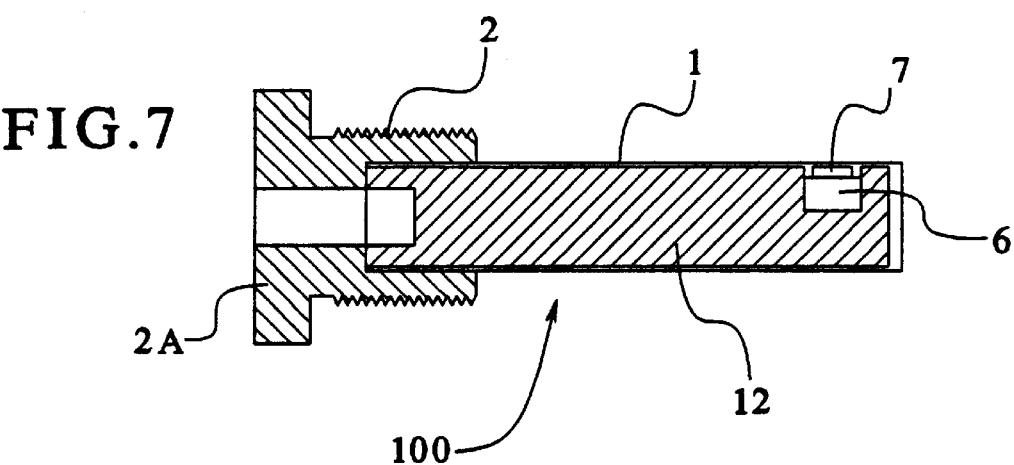
FIG. 7 is a cross-sectional view of the transducer.

FIG. 7 shows a cross-section of the side looking Hall-Effect vehicle speed sensor 7. Shown is the flange 2, printed wiring board sub-assembly 12, transducer tubular body 1, Hall-Effect sensor 7 and the biasing magnet 6.

Figure 8:
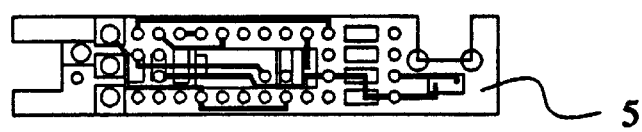
FIG. 8 is a plan view of the component side of the printed wiring board.

FIG. 8 is a plan view of the component side of the printed wiring board 5.

Figure 9:
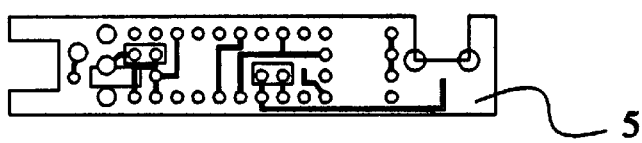
FIG. 9 is a plan view of the solder side of the printed wiring board.

FIG. 9 is a plan view of the solder side of the printed wiring board 5.

Figure 10:
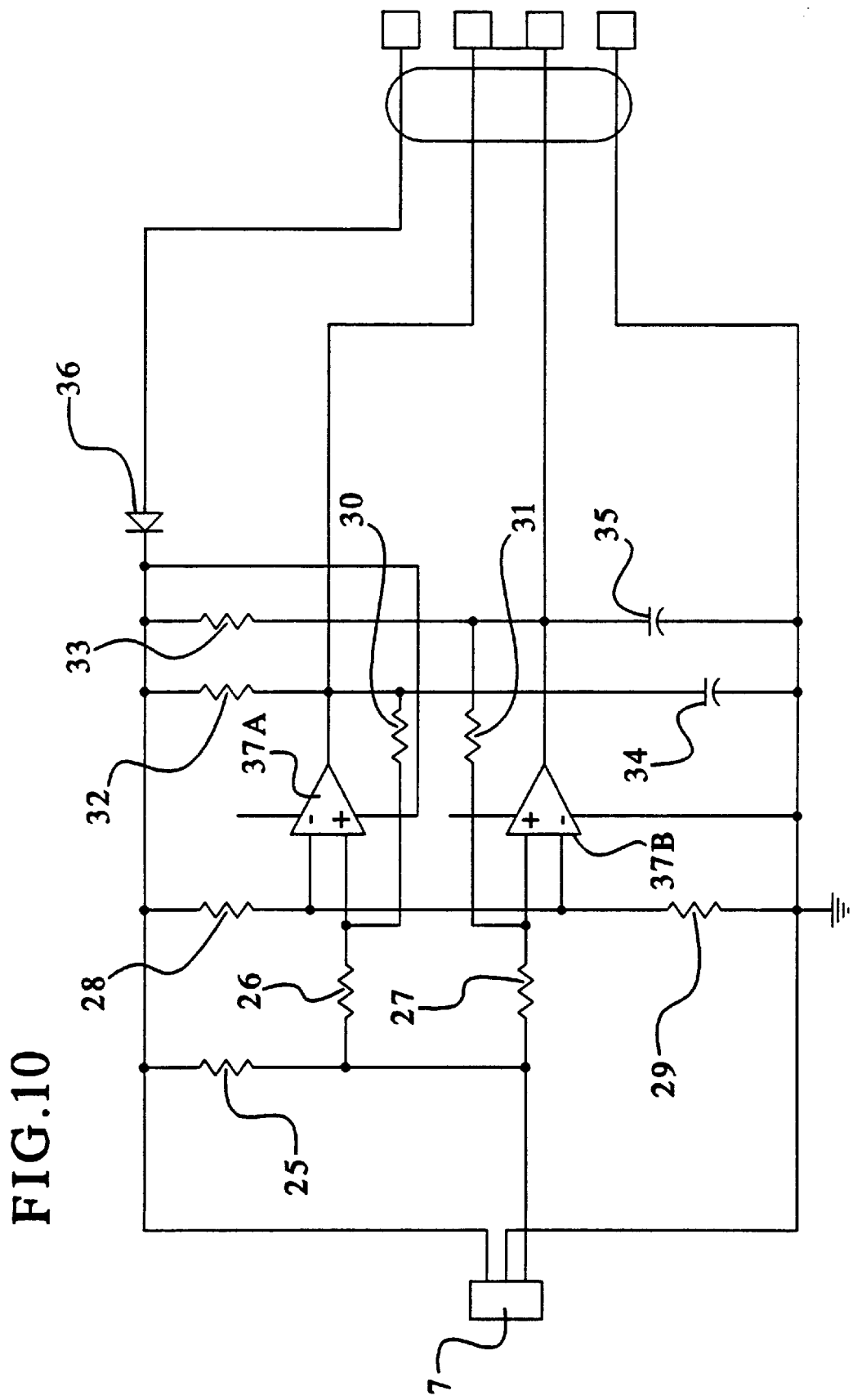
FIG. 10 is an electrical schematic wiring diagram of the sensor circuit.

FIG. 10 is a schematic diagram showing the interconnections between each component of the transducer's electronic circuit at the sub-assembly 12.

Referring to FIG. 10, the Hall-Effect sensor 7 is supplied with suitable power. Output of the sensor 7 is coupled through coupling resistors 26 and 27 into non-inverting ports of voltage comparator 37A and 37B. The inverting input ports of the voltage comparators 37A and 37B are connected to a voltage divider formed of resistors 28 and 29. The divider network establishes a threshold voltage for the two comparators. The input signal must exceed this threshold voltage by at least 20 millivolts in order for the comparator to recognize it and change the output from non-conducting to conducting. Because the comparator chosen for this application is of the open collector configuration, pull up resistors 32 and 33 are provided so that the output stage has a load to drive. To prevent the possibility of signal anomalies such as transient ringing during signal transitions from a low to high state, positive feedback for each comparator is provided through resistors 30 and 31. This feedback also causes a hysteresis to be established in that by feeding some of the output signal back into the input, the voltage level which will cause the comparator to switch back to its previous state must be slightly lower than the level which caused the initial transition. Capacitors 34 and 35 are filter capacitors intended to filter out any high frequency ringing which might occur. Diode 36 is a rectifier diode placed in the circuit to protect the transducer from accidental damage due to application of power of reverse polarity. Although the circuit shown in FIG. 10 is the preferred embodiment, it is not the only operable circuit configuration. This configuration is intended to provide two independent output signals. One to supply an engine control computer with vehicle speed signals, and the other to be applied to other ancillary instrumentation such as speedometers, odometers, cruise controls etc. Obviously, both outputs need not be brought out if only one is necessary. Versions of this transducer have been constructed using only a single output.

Although various minor modifications might be suggested by those skilled in the art, it should be understood that my wish to embody within the scope of the patent warranted hereon all such modifications as reasonably and properly come with the scope of my contribution to the art.

I claim as my invention:

1. A speed sensor for sensing rotating speed of a wheel having sensible members, comprising:

an elongated tubular sensor body connecting to a flange, said flange being adapted for mounting in a housing wall in proximity to the wheel;

a Hall-Effect sensor within the sensor body and circuitry for processing signals from the Hall-Effect sensor;

the Hall-Effect sensor being positioned for sensing the sensible members of the wheel through a portion of a peripheral sidewall of the cylindrical sensor body;

an alignment mark on the flange for positioning the Hall-Effect sensor in sensing alignment with the wheel;

a diameter of the flange cooperating with a placement of a receiving aperture in said housing for setting a width of a gap between said portion of the sensor body through which the Hall-Effect sensor is sensing and said sensible members of the wheel; and the flange having a lock nut for locking the flange to the housing wall after the alignment mark has been positioned by rotating the flange.

2. The sensor according to claim 1 wherein the Hall-Effect sensor is positioned at a leading end of the cylindrical sensor body at a portion of the peripheral sidewall adjacent the leading end of the sensor body.

3. The sensor according to claim 1 wherein a lock nut is provided received on threads of the flange and wherein threads of the flange terminate so that an undercut exists between a head of the flange and the termination of the threads on the flange so that the lock nut can be backed up tight against the head of the flange when the sensor is screwed into the housing wall, thereby permitting the sensor to be backed off by rotating the flange for orientation of the alignment mark and subsequent tightening of the lock nut.

4. The sensor according to claim 1 wherein the Hall-Effect sensor has an output coupled to a voltage comparator circuit which compares the Hall-Effect output to a threshold voltage to provide an output signal indicative of the sensible members on the wheel.

5. The sensor according to claim 4 wherein two voltage comparators are provided each receiving a threshold voltage.

6. The sensor according to claim 4 wherein a feedback is provided to prevent possible anomalies during signal transitions from one state to another state.

7. The sensor according to claim 4 wherein a capacitor is provided to filter out high frequency ringing.

8. The sensor according to claim 4 wherein a diode is provided as a rectifier to protect the Hall-Effect sensor and associated circuitry from accidental damage due to application of power of reverse polarity.

9. The sensor according to claim 1 wherein two independent output signals are provided by circuitry associated with the Hall-Effect transducer, one signal to supply an engine control computer with vehicle speed signals and the other to be applied to other ancillary instrumentation.

10. The sensor according to claim 1 wherein the wheel is a tone wheel of an automatic transmission and has a plurality of equally spaced teeth.

11. The sensor according to claim 1 wherein said sensible members of the wheel are projecting teeth.

12. The sensor according to claim 1 wherein said Hall-Effect sensor is directly adjacent an inner surface of said peripheral sidewall portion, and wherein the Hall-Effect sensor includes a magnet directly underneath a Hall-Effect sensor element so that the Hall-Effect sensor element is sandwiched between the magnet and the peripheral sidewall portion.

13. The sensor according to claim 1 wherein the alignment mark is positioned perpendicular to the longitudinal axis of the transmission.

14. A speed sensor system, comprising:

a wheel having projections in a transmission;

an elongated tubular sensor body connecting to a flange, said flange being mounted in a transmission housing wall in proximity to the wheel with projections;

a Hall-Effect sensor within the sensor body and circuitry for processing signals from the Hall-Effect sensor;

the Hall-Effect sensor being positioned for sensing the projections of the wheel through a portion of a peripheral sidewall of the cylindrical sensor body;

an alignment mark on the flange for positioning the Hall-Effect sensor in sensing alignment with the wheel;

a diameter of the flange cooperating with a placement of a receiving aperture in said housing for setting a width of a gap between said portion of the sensor body through which the Hall-Effect sensor is sensing and projections of the wheel; and two independent output signals are provided by circuitry associated with the Hall-Effect transducer, one signal to supply an engine control computer with vehicle speed signals and the other to be applied to other ancillary instrumentation.

15. A speed sensor for sensing rotating speed of a wheel having sensible members, comprising:

an elongated tubular sensor body connecting to a flange, said flange being adapted for mounting in a housing wall in proximity to the wheel;

a Hall-Effect sensor within the sensor body and circuitry for processing signals from the Hall-Effect sensor;

the Hall-Effect sensor being positioned for sensing the sensible members of the wheel through a portion of a peripheral sidewall of the cylindrical sensor body;

a diameter of the flage cooperating of a receiving aperture in said housing for setting a width of a gap between said portion of the sensor body through which the Hall-Effect sensor is sensing and said sensible members of the wheel;

said circuit having a capacitor to filter out high frequency ringing; and said circuit having a feedback to prevent possible anomalies during signal transitions from one state to another state.

16. The speed sensor according to claim 15 wherein said Hall-Effect sensor is directly adjacent an inner surface of said peripheral sidewall portion, and wherein the Hall-Effect sensor includes a magnet directly underneath a Hall-Effect sensor element so that the Hall-Effect sensor element is sandwiched between the magnet and the peripheral sidewall portion.

17. A method for sensing rotating speed of a tone wheel of an automatic transmission having sensible members, comprising the steps of:

providing an elongated tubular sensor body connecting to a flange, said flange being adapted for mounting in a housing wall of a housing in proximity to the tone wheel;

said flange having an alignment mark and said sensor body receiving a nut;

providing a Hall-Effect sensor within the sensor body and circuitry for processing signals from the Hall-Effect sensor;

positioning the Hall-Effect sensor by use of said alignment mark for sensing the sensible members of the tone wheel through a portion of a peripheral sidewall of the cylindrical sensor body and then locking the sensor body in position by tightening the nut, so that a side of the tubular sensor where the Hall-Effect sensor is located directly faces the tone wheel sensible members; and providing a diameter of the flange and placing a receiving aperture in said housing in order to set a width of a gap between said portion of the sensor body through which the Hall-Effect sensor is sensing and said sensible members of the wheel.

* * * * *